(12) United States Patent
Shuen et al.

(10) Patent No.: US 7,480,258 B1
(45) Date of Patent: Jan. 20, 2009

(54) CROSS STACK RAPID TRANSITION PROTOCOL

(75) Inventors: Pauline Shuen, Palo Alto, CA (US); Chinying Chaou, Saratoga, CA (US); Mallikarjuna R. Padavala, Santa Clara, CA (US); Moni Pande, Sunnyvale, CA (US); Shyamasundar S. Kaluve, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 947 days.

(21) Appl. No.: 10/614,257

(22) Filed: Jul. 3, 2003

(51) Int. Cl.
*H04L 12/28* (2006.01)
(52) U.S. Cl. ...................... 370/256; 370/217
(58) Field of Classification Search ............. None
See application file for complete search history.

(56) References Cited

U.S. PATENT DOCUMENTS

| | | | |
|---|---|---|---|
| 5,394,402 A | | 2/1995 | Ross |
| 5,802,333 A | * | 9/1998 | Melvin ............ 710/316 |
| 6,006,259 A | * | 12/1999 | Adelman et al. ....... 709/223 |
| 6,032,194 A | | 2/2000 | Gai et al. |
| 6,388,995 B1 | | 5/2002 | Gai et al. |
| 6,535,491 B2 | | 3/2003 | Gai et al. |
| 6,628,624 B1 | | 9/2003 | Mahajan et al. |
| 6,724,734 B1 | * | 4/2004 | Shabtay et al. ........ 370/254 |
| 6,785,272 B1 | * | 8/2004 | Sugihara ............ 370/386 |
| 6,981,034 B2 | * | 12/2005 | Ding et al. ........... 709/223 |
| 2002/0046271 A1 | * | 4/2002 | Huang ................ 709/223 |

OTHER PUBLICATIONS

Catalyst 2900 Series XL and Catalyst 3500 Series XL Software Configuration Guide, Cisco IOS Release 12.0(5)WC3, Jan. 2002.

(Continued)

*Primary Examiner*—Wing F Chan
*Assistant Examiner*—Anthony Sol
(74) *Attorney, Agent, or Firm*—Cesari and McKenna LLP

(57) ABSTRACT

A cross stack rapid transition protocol is provided for permitting multiple network devices organized as a stack to rapidly transition their ports in response to network changes so as to minimize traffic flow disruptions while avoiding loops. Each switch in the stack has a stack port that connects the switch to another switch in the stack, and a plurality of ports for connecting the switch to other entities of the computer network. Each switch includes a Spanning Tree Protocol (STP) entity that transitions the ports of the switch among a plurality of states including a forwarding state and a blocking state. Each switch also tracks which other switches are members of the switch stack. The stack port of each switch is transitioned to the forwarding state, and a single switch having connectivity to a root is elected to be a Stack Root. One or more other switches may have Alternate Stack Root Ports, that provide alternate paths to the root. If the current Stack Root loses connectivity to the root, the switch whose Alternate Stack Root Port represents the next best path to the root issues one or more proposal messages to the other members of the switch stack. These other members respond with an Acknowledgement, and the former Stack Root transitions its port to the blocking state. Once the proposing switch receives an Acknowledgment from all other active members of the switch stack, it transitions its Alternate Stack Root Port to the forwarding state so that network messages can be forwarded to and from switch stack.

15 Claims, 5 Drawing Sheets

OTHER PUBLICATIONS

Catalyst 3550 Multilayer Switch Software Configuration Guide, Chapter 16 entitled Configuring Optional Spanning-Tree Features, No. 78-11194-04.

Cisco, Understanding Rapid Spanning-Tree Protocol (802.1w), Document ID No. 24062, Nov. 2002.

Cisco, Understanding Rapid Spanning-Tree Protocol (802.1s), Document ID No. 24248, Jan. 2002.

ANSI/IEEE Std 802.2D, 1998 Edition entitled Part 3: Media Access Control (MAC) Bridges.

Draft Standard P802.1Q/D10, IEEE Standards for Local and Metropolitan Area Networks: Virtual Bridged Local Area Networks, 1998.

* cited by examiner

FIG. 5

| MAC DA | MAC SA | ETHERNET SNAP | VERSION | TYPE | STACK SWITCH ID |
|---|---|---|---|---|---|
| 502 | 504 | 506 | 508 | 510 | 512 |

| MAC DA | MAC SA | ETHERNET SNAP | VERS | TYPE | SENDING BRIDGE | DESIGNATED BRIDGE | INSTANCE ID | CST ROOT ID | ROOT PATH COST | DESIGNATED PATH COST | INSTANCE ROOT ID | INSTANCE ROOT PATH COST | PORT ID |
|---|---|---|---|---|---|---|---|---|---|---|---|---|---|
| 602 | 604 | 606 | 608 | 610 | 612 | 614 | 616 | 618 | 620 | 622 | 624 | 626 | 628 |

600

CROSS STACK RAPID TRANSITION PROTOCOL

BACKGROUND OF THE INVENTION

1. Field of the Invention

This invention relates to computer networks and, more specifically, to reconfiguring a computer network.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication is protocol (LAN standard), such as Ethernet, FDDI, Wireless Fidelity (Wi-Fi) or token ring that defines the functions performed by data link and physical layers of a communications architecture (i.e., a protocol stack).

Spanning Tree Algorithm

Most computer networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely.

Furthermore, some devices, such as bridges or switches, replicate frames whose destination is not known resulting in a proliferation of data frames along loops. The resulting traffic can overwhelm the network. Other intermediate devices, such as routers, that operate at higher layers within the protocol stack, such as the Internetwork Layer of the Transmission Control Protocol/Internet Protocol ("TCP/IP") reference model, deliver data frames and learn the addresses of entities on the network differently than most bridges or switches, such that routers are generally not susceptible to sustained looping problems.

To avoid the formation of loops, most bridges and switches execute a spanning tree protocol which allows them to calculate an active network topology that is loop-free (i.e., a tree) and yet connects every pair of LANs within the network (i.e., the tree is spanning). The IEEE has promulgated a standard (IEEE Std. 802.1D-1998™) that defines a spanning tree protocol to be executed by 802.1D compatible devices. In general, by executing the 802.1D spanning tree protocol, bridges elect a single bridge within the bridged network to be the "Root Bridge". The 802.1D standard takes advantage of the fact that each bridge has a unique numerical identifier (bridge ID) by specifying that the Root Bridge is the bridge with the lowest bridge ID. In addition, for each LAN coupled to any bridge, exactly one port (the "Designated Port") on one bridge (the "Designated Bridge") is elected. The Designated Bridge is typically the one closest to the Root Bridge. All ports on the Root Bridge are Designated Ports, and the Root Bridge is the Designated Bridge on all the LANs to which it has ports.

Each non-Root Bridge also selects one port from among its non-Designated Ports (its "Root Port") which gives the lowest cost path to the Root Bridge. The Root Ports and Designate Ports are selected for inclusion in the active topology and are placed in a forwarding state so that data frames may be forwarded to and from these ports and thus onto the LANs interconnecting the bridges and end stations of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages or simply BPDUs. BPDUs carry information, such as assumed root and lowest root path cost, used in computing the active topology. More specifically, upon start-up, each bridge initially assumes itself to be the Root Bridge and transmits BPDUs accordingly. Upon receipt of a BPDU from a neighboring device, its contents are examined and compared with similar information (e.g., assumed root and lowest root path cost) stored by the receiving bridge in memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDUs are not forwarded by bridges, the identifier of the Root Bridge is eventually propagated to and adopted by all bridges as described above, allowing them to select their Root Port and any Designated Port(s).

In order to adapt the active topology to changes and failures, the Root Bridge periodically (e.g., every hello time) transmits BPDUs. In response to receiving BPDUs on their Root Ports, bridges transmit their own BPDUs from their Designated Ports, if any. Thus, BPDUs are periodically propagated throughout the bridged network, confirming the active topology. As BPDU information is updated and/or timed-out and the active topology is calculated, ports may transition from the blocking state to the forwarding state and vice versa. That is, as a result of new BPDU information, a previously blocked port may learn that it should be in the forwarding state (e.g., it is now the Root Port or a Designated Port).

Rapid Spanning Tree Protocol

Recently, the IEEE promulgated a new standard (the 802.1w standard) that defines a rapid spanning tree protocol (RSTP) to be executed by otherwise 802.1D compatible devices. The RSTP similarly selects one bridge of a bridged network to be the root bridge and defines an active topology that provides complete connectivity among the LANs while severing any loops. Each individual port of each bridge is assigned a port role according to whether the port is to be part of the active topology. The port roles defined by the 802.1w standard include Root, Designated, Alternate and Backup. The bridge port offering the best, e.g., lowest cost, path to the root is assigned the Root Port Role. Each bridge port offering an alternative, e.g., higher cost, path to the root is assigned the Alternate Port Role. Each bridge port providing the lowest cost path from a given LAN is assigned the Designated Port Role, while all other ports coupled to the given LAN in loop-back fashion are assigned the Backup Port Role.

Those ports that have been assigned the Root Port and Designated Port Roles are placed in the forwarding state, while ports assigned the Alternate and Backup Roles are placed in a discarding or blocking state. A port assigned the Root Port Role can be rapidly transitioned to the forwarding state provided that all of the ports assigned the Alternate Port Role are placed in the discarding or blocking state. Similarly, if a failure occurs on the port currently assigned the Root Port Role, a port assigned the Alternate Port Role can be reassigned to the Root Port Role and rapidly transitioned to the forwarding state, providing that the previous root port has been transitioned to the discarding or blocking state. A port assigned the Designated Port Role or a Backup Port that is to be reassigned to the Designated Port Role can be rapidly transitioned to the forwarding state, provided that the roles of the ports of the downstream bridge are consistent with this port being assigned the Designated Port Role. The RSTP provides an explicit handshake to be used by neighboring bridges to confirm that a new designated port can rapidly transition to the forwarding state.

Like the STP described in the 802.1D specification standard, bridges running RSTP also exchange BPDU messages in order to determine which roles to assign to the bridge's ports. The BPDU messages are also utilized in the handshake employed to rapidly transition designated ports to the forwarding state.

FIG. 1 is a block diagram of a RSTP BPDU message 100. The BPDU message 100 includes a BPDU message header 102 compatible with the Media Access Control (MAC) layer of the respective LAN standard. The message header 102 comprises a plurality of fields (not shown), such as a destination address (DA) field and a source address (SA) field. The DA field carries a unique bridge multicast destination address assigned to the spanning tree protocol. Appended to header 102 is a BPDU message area 104 that also contains a number of fields, including a protocol identifier (ID) field 106, a protocol version number field 108, a BPDU type field 110, a flags field 112, a root ID field 114, a root path cost field 116, a bridge ID field 118, a port ID field 120, a message age field 122, a maximum age field 124, a hello time field 126, and a forward delay field 128, among others. The root identifier field 114 typically contains the identifier of the bridge assumed to be the root and the bridge identifier field 118 contains the identifier of the bridge sourcing (i.e., sending) the BPDU 100. The root path cost field 116 contains a value representing the cost to reach the assumed root from the port on which the BPDU is sent, and the port identifier field 120 contains the identifying number of the port from which the BPDU is sent.

As shown, the flags field 112 carries a plurality of single or multiple bit flags that may be set, e.g., asserted, or cleared, e.g., de-asserted. Specifically, the flags field 112 includes a topology change flag 130, a proposal flag 132, a port role flag 134, a learning flag 136, a forwarding flag 138, an agreement flag 140 and a topology change acknowledgment (ACK) flag 142. The learning and forwarding flags 136 and 138 are set to reflect the current port state of the port from which the corresponding BPDU is being sent.

The handshake utilized by adjacent bridges for rapidly transitioning designated ports typically proceeds as follows. When an upstream bridge wishes to rapidly transition a designated port to the forwarding state, it issues a BPDU 100 from that port whose proposal flag 132 is asserted. The port role flag 134 is set to the value associated with the Designated Port Role. In the root ID and root path cost fields 114 and 116, the upstream bridge loads the corresponding information relative to the port from which the BPDU message 100 is to be sent. The upstream bridge then sends the BPDU message which is received at the neighboring downstream bridge.

Assuming the information contained in the BPDU message 100 is equal to or better than that currently stored by the port of the downstream bridge at which the BPDU is received, the downstream bridge asserts "sync" for all of its other bridge ports. Sync is a state machine variable defined by the 802.1w specification standard. Basically, this has the effect of causing the downstream bridge to transition all of its designated ports, other than "edge" ports, to the discarding state. An edge port is defined as a port which provides the only connection to a respective LAN, thereby representing an edge of the bridged network. Once the designated ports have been transitioned to the discarding state, the downstream bridge responds, typically through its root port, to the upstream bridge with a BPDU message 100 whose agreement flag 140 is asserted. This notifies the upstream bridge that the downstream bridge is in agreement with the upstream bridge's request to transition the respective port to the forwarding state.

In addition, the designated port(s) of the downstream bridge request permission from their downstream bridges to rapidly transition back to the forwarding state following the same process. That is, BPDU messages 100 with their proposal flags 132 asserted are sent from these ports. In effect, a "cut" is made in the active topology at the first affected designated port and the cut propagates down from this first designated port through all bridges on the subtree below it, i.e., in a direction away from the root, until the cut reaches the edge of the bridged network.

Virtual Local Area Networks

Is A computer network may also be segmented into a series of logical networks. For example, U.S. Pat. No. 5,394,402, issued Feb. 28, 1995 to Ross (the "'402 Patent"), discloses an arrangement for associating any port of a switch with any particular network segment. Specifically, according to the '402 patent, any number of physical ports of a particular switch may be associated with any number of groups within the switch by using a virtual local area network (VLAN) arrangement that virtually associates the port with a particular VLAN designation. More specifically, the switch or hub associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. Those entities having the same VLAN designation function as if they are all part of the same LAN. In order to preserve the boundaries of each VLAN, VLAN-aware bridges are specifically configured to prevent messages from being passed between parts of the network having different VLAN designations. Nonetheless, intermediate network devices operating above layer 2 (L2), such as routers, can relay messages between different VLAN segments.

In addition to the '402 patent, the IEEE promulgated a specification standard (IEEE Std. 802.1Q-1998) for Virtual Bridged Local Area Networks. To preserve VLAN associations of messages transported across trunks or links in VLAN-aware networks, both Ross and IEEE Std. 802.1Q-1998 disclose appending a VLAN identifier (VID) field to the corresponding frames. In addition, U.S. Pat. No. 5,742,604 to Edsall et al. (the "'604 patent"), which is commonly owned with the present application, discloses an Interswitch Link (ISL) encapsulation mechanism for efficiently transporting packets or frames, including VLAN-modified frames, between switches while maintaining the is VLAN association of the frames. In particular, an ISL link, which may utilize the Fast Ethernet standard, connects ISL interface circuitry disposed at each switch. The transmitting ISL circuitry encapsulates the frame being transported within an ISL header and ISL error detection information, while the ISL receiving circuitry strips off this information and recovers the original frame.

Multiple Spanning Tree Protocol

Recently, the IEEE published a supplement to IEEE Std. 802.1Q-1998 describing a Spanning Tree Protocol that is specifically designed for use with networks that support VLANs. The Multiple Spanning Tree Protocol (MSTP), which is identified as IEEE Std. 802.1s-2002, organizes a bridged network into regions. Within each region, MSTP establishes an Internal Spanning Tree (IST) which provides connectivity to all bridges within the respective region and to the ISTs established within other regions. The IST established within each MSTP Region also provides connectivity to the one Common Spanning Tree (CST) established outside of the MSTP regions by IEEE Std. 802.1Q-1998 compatible bridges running STP or RSTP. The IST of a given MST Region receives and sends BPDUs to the CST. Accordingly, all bridges of the bridged network are connected by a single Common and Internal Spanning Tree (CIST). From the point of view of the legacy or IEEE 802.1Q bridges, moreover, each MST Region appears as a single "virtual" bridge on the CST.

Within each MST Region, the MSTP compatible bridges establish a plurality of active topologies, each of which is called a Multiple Spanning Tree Instance (MSTI). The MSTP bridges also assign or map each VLAN to one and only one of the MSTIs. Because VLANs may be assigned to different MSTIs, frames associated with different VLANs can take different paths through an MSTP Region. The bridges may, but typically do not, compute a separate topology for every single VLAN, thereby conserving processor and memory resources. Each MSTI is basically a simple RSTP instance that exists only inside the respective Region, and the MSTIs do not interact outside of the Region.

MSTP also uses BPDUs to establish the ISTs and MSTIs as well as to define the boundaries of the different MSTP Regions. The bridges do not send separate BPDUs for each MSTI. Instead, every MSTP BPDU carries the information needed to compute the active topology for all of the MSTIs defined with the respective Region. Each MSTI, moreover, has a corresponding Identifier (ID) and the MSTI IDs are encoded into the bridge IDs. That is, each bridge has a unique ID, as described above, and this ID is made up of a fixed portion and a settable portion. With MSTP, the settable portion of a bridge's ID is further organized to include a system ID extension. The system ID extension corresponds to the MSTI ID. The MSTP compatible bridges within a given Region will thus have a different bridge ID for each MSTI. For a given MSTI, the bridge having the lowest bridge ID for that instance is elected the root. Thus, an MSTP compatible bridge may be the root for one MSTI but not another within a given MSTP Region.

Each bridge running MSTP also has a single MST Configuration Identifier (ID) that consists of three attributes: an alphanumeric configuration name, a revision level and a VLAN mapping table that associates each of the potential 4096 VLANs to a corresponding MSTI. Each bridge, moreover loads its MST Configuration ID into the BPDUs sourced by the bridge. Because bridges only need to know whether or not they are in the same MST Region, they do not propagate the actual table(s) mapping VLANs to MSTIs in their BPDUs. Instead, the MST BPDUs carry only a digest of the VLAN-to-MSTI mapping table(s). The digest is generated by applying the well-known MD-5 algorithm to the VLAN-to-MSTI mapping table(s). When a bridge receives an MST BPDU, it extracts the MST Configuration ID contained therein, including the digest, and compares it to its own MST Configuration ID to determine whether it is in the same MST Region as the bridge that sent the MST BPDU. If the two MST Configuration IDs are the same, then the two bridges are in the same MST Region. If, however, the two MST Configuration IDs have at least one non-matching attribute, i.e., either different configuration names, different revision levels and/or different computed digests, then the bridge that received the BPDU concludes that it is in a different MST Region than the bridge that sourced the BPDU. A port of an MST bridge, moreover, is considered to be at the boundary of an MST Region if the Designated Bridge is in a different MST Region or if the port receives legacy BPDUs.

FIG. 2 is a highly schematic block diagram of an MST BPDU 200. The MST BPDU 200 includes a header 202 compatible with the Media Access Control (MAC) layer of the respective LAN standard, e.g., Ethernet. The header 202 comprises a destination address (DA) field, a source address (SA) field, a Destination Service Access Point (DSAP) field, and a Source Service Access Point (SSAP), among others. The DA field 204 carries a unique bridge multicast destination address assigned to the spanning tree protocol, and the DSAP and SSAP fields carry standardized identifiers assigned to the spanning tree protocol. Appended to header 202 is a BPDU message area that includes an "outer" part 204 and an "inner" part 206. The outer part 204 has the same format as an RSTP BPDU message and is recognized as a valid RSTP BPDU message by bridges that do not implement MSTP. The "inner" part 206 is utilized by bridges executing MSTP to establish the IST and the MSTIs. The inner part 206 has a set of spanning tree parameters for the IST and a set of parameters for each MSTI supported by the bridge sourcing the MSTP BPDU 200.

Outer part 204, also referred to as the CIST priority vector, has a plurality of fields, including a protocol identifier (ID) field 208, a protocol version ID field 210, a BPDU type field 212, a flags field 214, a CIST root ID field 216, an external path cost field 218, a CIST regional root ID field 220, a CIST port ID field 222, a message age field 224, a maximum (MAX) age field 226, a hello time field 228, and a forward delay field 230. The flags field 214 of other part 204 includes the flags 130-142 (FIG. 1) described above in connection with the RSTP BPDU message format. The CIST root identifier field 216 contains the identifier of the bridge assumed to be the root of the Common and Internal Spanning Tree, which may be in the same MSTP Region as the bridge sourcing the BPDU message 200, in another MSTP Region or in part of the bridged network that is not running MSTP. The external path cost field 218 contains a value representing the lowest cost from the bridge sourcing the BPDU 200 to the CIST root identified in field 216 without passing through any other bridge in the same region as the bridge that is sourcing the BPDU message 200.

Inner part 206, also referred to as an MSTI priority vector, similarly has a plurality of fields, including a version 1 length field 232, a null field 234, a version 3 length field 236, an MST configuration ID field 238, a CIST regional root ID field 240, a CIST regional path cost field 242, a CIST bridge ID field 244, a CIST port ID field 246, a CIST flags field 248, and a CIST hops field 250. Inner part 206 may further include one or more optional MSTI configuration messages 252, each of which constitutes another MSTI priority vector or M-record.

Because version 2 of the RSTP does not specify any additional fields beyond those already specified by version 1, the MST BPDU does not have a version 2 length field.

Each MSTI Configuration Message 252 consists of a plurality of fields including a CIST regional root ID field 260, a CIST regional path cost field 262, a CIST bridge ID field 264, a CIST port ID field 266, a CIST flags field 268 and a CIST hops field 270. MST bridges utilize the STP parameters contained in fields 240-150 of inner part 206 and in each MSTI configuration message 252 to compute an active topology for each MSTI configured in the respective region.

Stack Arrangements

Multiple network devices, such as switches, may also be physically connected and logically organized to form a stack or cluster that can be made to appear to other entities or devices within the computer network at least logically as a single, virtual switch. One such technique involves forming a cascaded switch network by coupling multiple physical switches together via suitable bus connection links, such as Ethernet, Fast Ethernet, Fast EtherChannel®, Cisco GigaStack Gigabit Interface Converter (GBIC), Gigabit Ethernet, and Gigabit EtherChannel connections, among others (which may comprise additional circuitry), and programming the switches' internal control and forwarding circuitry, e.g., switch network management, bridge forwarding, etc., so as to permit the switches to operate as a single virtual switch. Examples of such clusters include the Catalyst Matrix™ from Cisco Systems, Inc.

The deployment of such stack or cluster designs within computer networks can affect the operation of the spanning tree protocol. Accordingly, a need exists for a technique that prevents loops while working efficiently with network devices organized into a stack or cluster.

SUMMARY OF THE INVENTION

Briefly, the present invention is directed to a cross stack rapid transition protocol that permits multiple network devices organized as a stack or cluster to rapidly transition the ports of the devices in response to network changes and failures. Each switch that is a member of the stack has a stack port that connects the switch to other stack members, and a plurality of ports for connecting the switch to other entities of a computer network. Each switch also has a Spanning Tree Protocol (STP) entity that is preferably configured to operate in accordance with the Rapid Spanning Tree Protocol (RSTP) or, if the switch support Virtual Local Area Networks (VLANs), the Multiple Spanning Tree Protocol (MSTP). The STP entity transitions the ports of the switch among a plurality of spanning tree port states including a forwarding state and a blocking state. In the illustrative embodiment, each switch further includes a neighbor discovery engine that issues and listens for messages from the other members of the stack in order to determine which other switches are active stack members. Each switch also includes a cross-stack rapid transition (CSRT) engine that has a message generator and an Acknowledgement (ACK) list.

In accordance with the present invention, STP parameters of each switch in the stack are preconfigured so that the STP entity at each switch transitions its stack port to the forwarding state for all VLANs, if any, enabled on the stack port. In the illustrated embodiment, the stack ports are assigned a port cost of zero to achieve the desired forwarding state. This also ensures that only one stack member, known as the Stack Root, provides a path to the root of the bridged network through its Stack Root Port. Other stack members, known as Alternate Stack Root switches, preferably have ports, known as Alternate Stack Root Ports, that provide alternate paths to the root of the bridged network. These Alternate Stack Root Ports, however, are deliberately placed, at least initially, in the blocking spanning tree port state for all VLANs enabled on those ports. In response to network changes or failures, the stack members execute the cross-stack rapid transition protocol to quickly reestablish connectivity between the stack and the root without introducing even temporary loops.

For example, if the Stack Root fails, the Alternate Stack Root switches, upon detecting the failure of the Stack Root, each transmit proposal bridge protocol data unit (BPDU) messages from their stack ports. Each Alternate Stack Root switch compares the proposals it receives with its own proposal to determine which proposal constitutes the best proposal, i.e., has the lowest cost path to the root. If the best proposal was a received proposal, the switch generates and sends a new message, known as a Rapid Transition Acknowledgment message, to the switch that issued the best proposal. Once the Alternate Stack Root switch that issued the best proposal receives a Rapid Transition Acknowledgement message from each active member of the stack, it transitions its Alternate Stack Root port directly to forwarding, thereby providing a resumption of connectivity between the root and the stack without introducing loops into the computer network.

BRIEF DESCRIPTION OF THE DRAWINGS

The invention description below refers to the accompanying drawings, of which:

FIGS. 5 and 6 are highly schematic illustrations of preferred message formats in accordance with the present invention.

DETAILED DESCRIPTION OF AN
ILLUSTRATIVE EMBODIMENT

Figure 3:
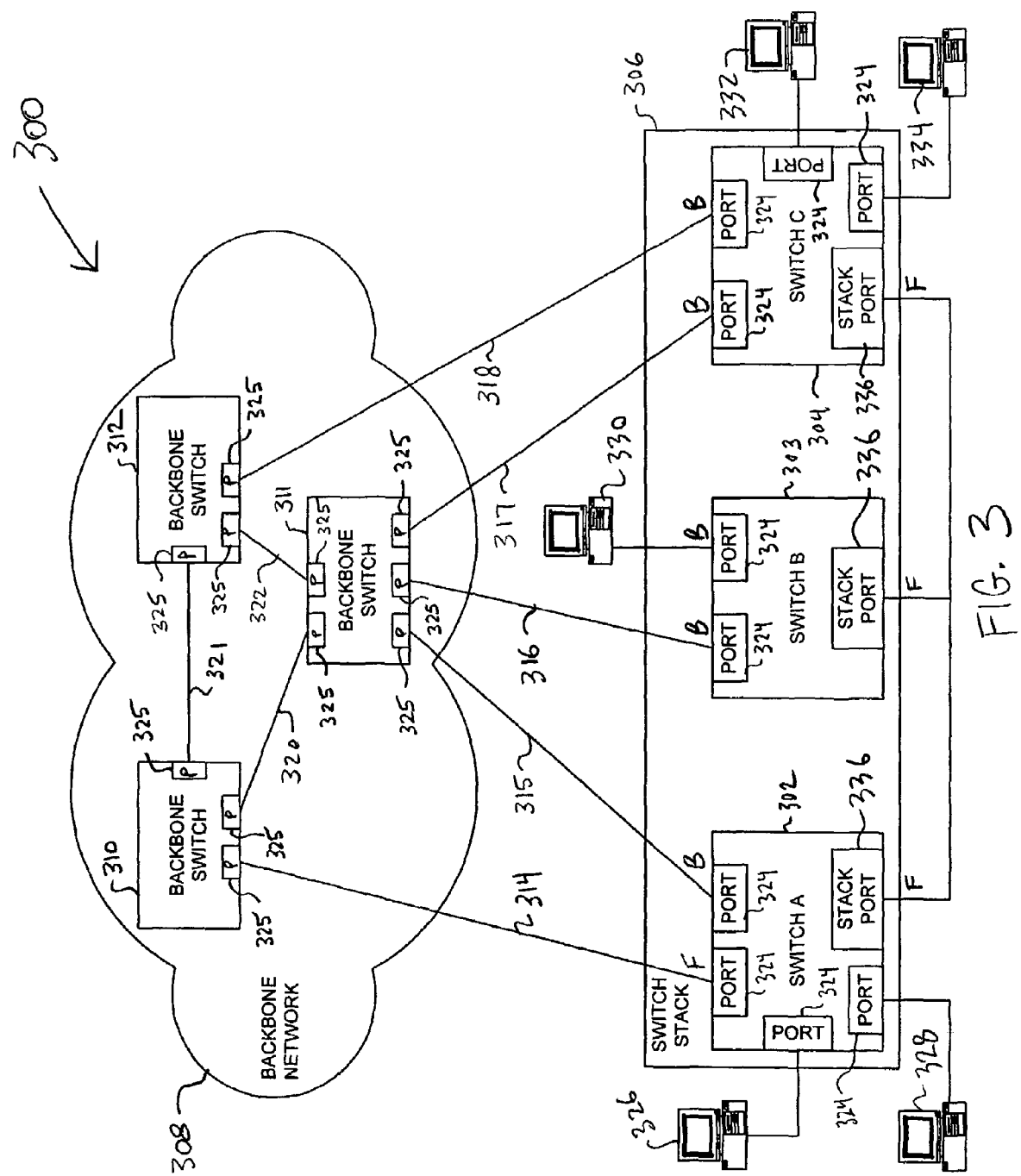
FIG. 3 is a highly schematic illustration of a bridged network, including a stack of switches configured in accordance with the present invention.

FIG. 3 is a highly schematic illustration of a bridged network 300. The bridged network 300 includes a plurality, e.g., three, intermediate network devices 302-304 that are organized as a stack 306. In the illustrative embodiment, the network devices 302-304 are network switches and the stack 306 is a switch stack. Bridged network 300 further includes a backbone network 308 which, in turn, includes a plurality of interconnected intermediate network devices, such as backbone switches 310-312. Each switch of switch stack 306 is individually coupled by one or more corresponding ports to the backbone network 308 by corresponds links, such as point-to-point links. Specifically, switch 302 is coupled to backbone switch 310 via link 314, and to backbone switch 311 via link 315. Switch 303 is coupled to backbone switch 311 via link 316. Switch 304 is coupled to backbone switch 311 via link 317, and to backbone switch 312 via link 318. Backbone switches 310-312 are interconnected by a plurality of links, such as links 320-322.

As indicated, each switch 302-304 of switch stack 306 as well as each backbone switch 310-312 preferably includes a plurality of ports (P) only some of which are shown. In particular, switches 302-304 each have a plurality of ports 324 for transmitting and receiving network messages, such as data and control packets or frames. Links 314-318 each connect to respective ports (P) 324 of switches 302-303. Backbone switches 310-312 similarly have a plurality of ports 325 for transmitting and receiving network messages. Links 314-318 and 320-322 each connect to respective ports (P) 325 of backbone switches 310-312. Other ports 324 of switches 302-304 may be connected to one or more network entities, such as end stations or hosts, so that the network entities may source or sink data frames to one another via the bridged network 300. For example, end stations 326 and 328 are coupled to respective ports 324 of switch 302. End station 330 is connected to a port 324 of switch 303. End stations 332 and 334 are each connected to a respective port 324 of switch 304.

In addition, each switch 302-303 of switch stack 306 has at least one stack port 336. Each stack port 336 couples to a link 328 that interconnects each of member, i.e., switches 302-304, of the switch stack 306. Link 328 may be a shared medium or it may be a plurality of separate links connecting switches 302-304 in a cascading fashion. Those skilled in the art will recognize that other inter-switch technologies may be employed. Each switch 302-304 and 310-312 identifies its own ports, e.g., by port numbers, such as zero, one, two, three, etc. Switches 302-306 and 310-312 are thus able to associate specific ports with the entities and/or other switches coupled thereto.

Each stack port 336 may be a single physical port or it may comprise multiple physical ports. In another embodiment, stack ports may not be physical ports at all. Instead, they may simply represent a logical communication path among the members of the stack. Those skilled in the art will recognize that other arrangements are possible.

It should be understood that the network 300 of FIG. 3 is meant for illustrative purposes only and that the present invention will operate with other networks having possibly far more complex topologies.

Depending on the implementation of network 300, switches 302-304 and 310-312 may be configured to logically organize the network 300 into one or more Virtual Local Area Network (VLAN) segments. That is, subsets of entities, such as LANs and end stations, may be logically grouped together to form VLANs. Each VLAN designation may also have a corresponding numeric identifier. For example, the IEEE Std. 802.1Q-1998 specification standard, which is hereby incorporated in its entirety, allocates the numeric identifiers 0-4095 as possible VLAN designations, thereby supporting up to 4096 different VLAN designations within a bridged network. Furthermore, ports 324 configured as trunk ports may operate in accordance with any number of VLAN encapsulation protocols, such as the encapsulation scheme described in IEEE Std. 802.1Q-1998 or the Interswitch Link (ISL) mechanism from Cisco Systems, Inc., as described in U.S. Pat. No. 5,742,604, which is also hereby incorporated by reference in its entirety. Those skilled in the art will understand that other VLAN encapsulation or tagging protocols may also be used.

As shown, bridged network 300 includes redundant links interconnecting switches 302-304 and 310-312. The existence of such redundant links prevents portions of the bridged network 300 from becoming isolated should any constituent link, port or network device fail. Such redundancy, however, also results in the creation of loops, which, as described above, are highly undesirable.

Figure 4:
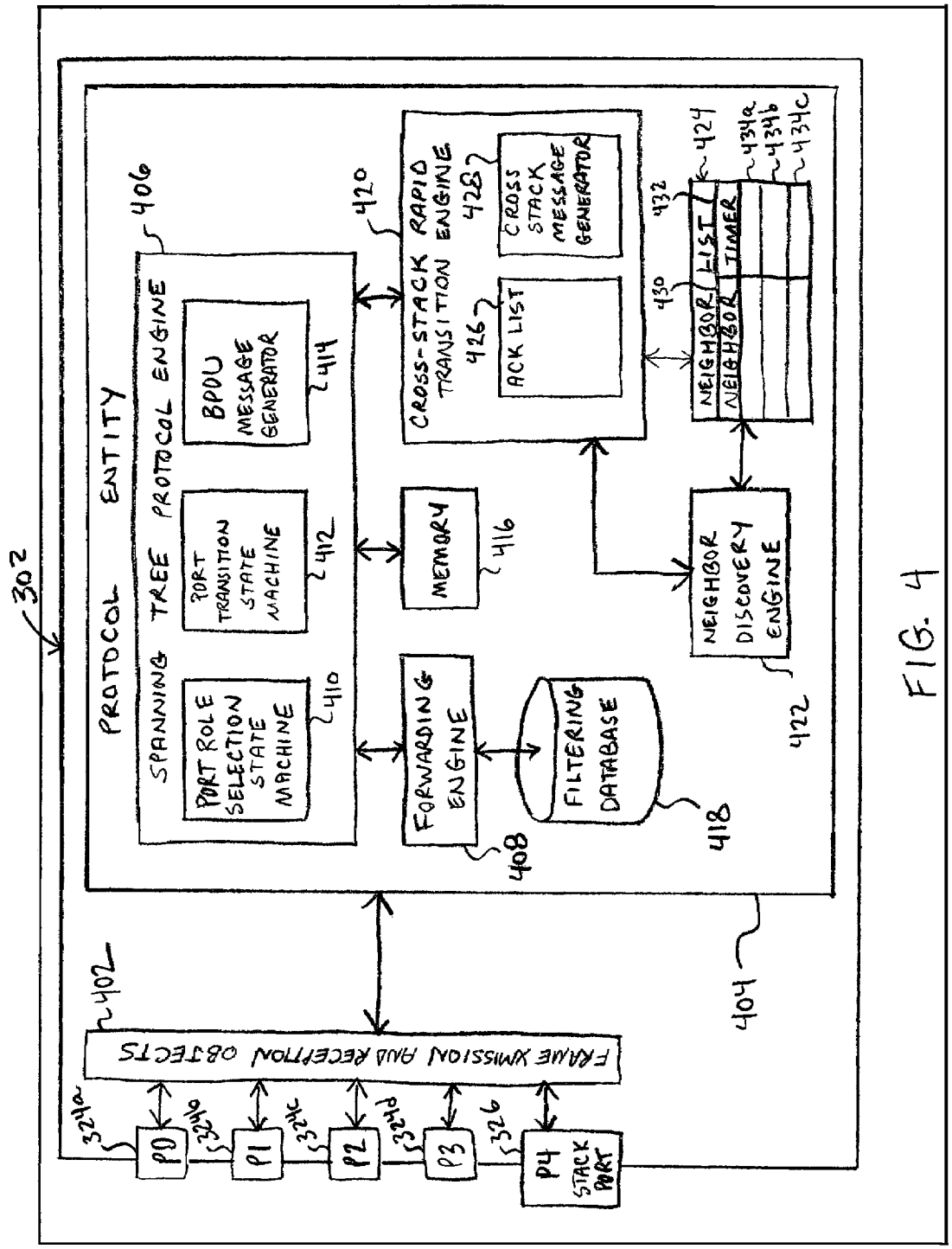
FIG. 4 is a highly schematic, partial illustration of a switch within the switch stack.

Execution of a spanning tree protocol prevents loops by defining a loop-free network topology (i.e., an active topology). Furthermore, execution of the Rapid Spanning Tree Protocol (RSTP) and/or the Multiple Spanning Tree Protocol (MSTP) will allow the ports of the switches 302-304 and 310-312 that are part of the active topology to transition rapidly to a forwarding state so that network messages can be forwarded with minimal disruption and delay. However, in some situations, the current implementation of the RSTP and MSTP may result in certain operating inefficiencies especially with regard to the switches 302-304 of switch stack 306. To avoid these inefficiencies, among other reasons, switches 302-304, which form switch stack 306 are configured and arranged to execute a new protocol in accordance with the present invention. This new protocol is identified as the cross-stack rapid transition protocol FIG. 4 is a highly schematic, partial block diagram of a switch, such as switch 302, that cooperates with other switches, in this cases switches 303 and 304, to form a switch stack, e.g., switch stack 306. Switch 302 includes a plurality of ports 324*a-d* each of which is preferably identified by a number, e.g., P0-P3, as well as a stack port 336 which may also be identified by a port number, e.g., P4. One or more frame transmission and reception objects, designated generally 402, are associated with ports 324*a-d* and stack port 336 such that network messages received at a given port, e.g., P3, may be captured, and frames to be transmitted by switch 302 may be delivered to a given port, e.g., PI.

Frame reception and transmission objects 402 are preferably message storage structures, such as priority queues. In the illustrated embodiment, switch 302 includes transmitting and receiving circuitry, including one or more line cards and/or network interface cards (NICs) establishing ports for the exchange of network messages, one or more or central processing units (CPUs) and/or microprocessors and associated memory devices for performing calculations and one or more bus structures.

Switch 302 further includes at least one protocol entity 404 comprising a plurality of components. In particular, the protocol entity 404 includes at least one spanning tree protocol (STP) engine 406 and at least one forwarding engine 408. The STP engine 406 preferably comprises a plurality of subcomponents, including a port role selection state machine 410, a port transition state machine 412, and a bridge protocol data unit (BPDU) message generator 414. Except as described herein, the STP engine 308 preferably operates substantially in compliance with one of the Rapid Spanning Tree Protocol (RSTP). (IEEE Std 802.1w.1w-2001) or the Multiple Spanning Tree Protocol (MSTP) (IEEE Std 802.1s-2002), specification standards, which are both hereby incorporated by reference in their entirety. The STP engine 406 includes or is in communicating relationship with a memory 416, which may be a volatile or non-volatile random access memory (RAM) or some other memory device. Memory 416 is preferably organized to include a plurality of addressable records or cells (not shown) for storing spanning tree related information or parameters, such as the switch's numeric bridge identifier (ID), the assigned path cost for each port 302*a-d* and 336, the current or "best" spanning tree information for each port 302*a-d* and 336, etc.

The forwarding engine 408 is in communicating relationship with the frame transmission and reception objects 402 and is coupled to at least one filtering database 418 that stores address information corresponding to the entities of bridged network 300 (FIG. 3). Specifically, filtering database 418 has a plurality of records (not shown) each containing a plurality of cells, including a destination address cell, a destination port cell and a corresponding timer cell. Each record in the filtering database 418 preferably corresponds to a particular network entity.

The forwarding engine 408 is configured to switch or bridge network messages from a source port 324 or 336 to one or more destinations ports 324 or 336 depending on information contained in the filtering database 418 and also on the spanning tree port states of the respective ports 324 or 336 as managed by STP engine 406. The forwarding engine 408 is also in communicating relationship with the STP engine 406 and relays RSTP or MSTP related messages, i.e., bridge protocol data units (BPDUs), received at ports 324 and 336 thereto.

In accordance with the present invention, the protocol entity 404 further includes a cross-stack rapid transition engine 420, a neighbor discovery engine 422 and a neighbor list 424. Engine 420, moreover, has an Acknowledgment (ACK) list 426 and a cross-stack message generator 428. The neighbor list 424 is preferably organized, at least logically, as an array having a plurality of columns and rows whose intersections define addressable cells for storing values or other information. Specifically, the neighbor list has a neighbor column 430, a timer column 432 and a plurality of rows 434*a-c*.

It will be understood by those skilled in the art that STP engine 406, forwarding engine 408, cross-stack rapid transition engine 420 and neighbor discovery engine 422 may each be implemented in hardware through registers and logic circuits formed from one or more Application Specific Integrated Circuits (ASICs) or Field Programmable Gate Arrays (FPGAs), among other hardware fabrication techniques. In the illustrated embodiment, engines 406, 408, 420 and 422 are preferably software modules or libraries containing program instructions pertaining to the methods described herein and executable by one or more processing elements (not shown) of switch 302. Other computer readable media may also be used to store and execute these program instructions. Nonetheless, those skilled in the art will recognize that various combinations of software and hardware, including firmware, may be utilized to implement the present invention.

Suitable intermediate network device platforms for use as stackable switches 302-304 include, but are not limited to, the commercially available Catalyst 2900, Catalyst 3500 and Catalyst 3750 family of switches from Cisco Systems, Inc.

Discovery of Other Stack Members

Each stackable switch 302-304 determines which other switches are members of the switch stack 306. Specifically, as indicated above, stackable switches 302-304 are configured such that their stack ports 336 are all interconnected. The neighbor discovery engine 422 at each stackable switch, such as switch 302, is configured to generate and transmit periodically, e.g., every discovery hello time (which may be one second), a Discovery Hello message on the switch's stack port 336 for receipt by the other stackable switches 303 and 304.

FIG. 5 is a highly schematic illustration of a preferred format of a Discovery Hello message 500. Specifically, Discovery Hello message 500 includes a Media Access Control (MAC) destination address (DA) field 502 that is preferably loaded with the BPDU multicast address specified in the IEEE Std 802.1D specification standard, and a MAC source address (SA), which is preferably loaded with the MAC address of the interface, e.g., the stack port 336, from which the Discovery Hello message 500 is being sent. Discovery Hello message 500 further includes an Ethernet Service Network Access Point (SNAP) field 506, a version field 508, a type field 510 and a switch Identifier (ID) field 512, which is preferably loaded with a unique value identifying the stackable switch that is transmitting the respective Discovery Hello message 500, such as a selected MAC address of the switch.

As switch 302 receives Discovery Hello messages 500 from switches 303 and 304 on its stack port 336, switch 302 updates its neighbor list 424. Specifically, such messages 500 are passed to the STP engine 406 due to the message's MAC DA, and engine 406 is configured to pass them to the neighbor discovery engine 422. It should be understood that the STP engine 406 may also be directly connected to the neighbor discovery engine 422. Engine 422 examines the messages 500 and, assuming there is not already an entry in neighbor list 424 for the switch that sent the received Discovery Hello message 500, engine 422 selects a free entry or row, e.g., row 434*a* of list 424. In the cell corresponding to the neighbor column 430, engine 422 enters the identifier (ID) of the switch, e.g., switch 303, that sent the Discovery Hello message 500 as contained in field 512. Engine 422 also activates a timer within the cell corresponding to timer column 432 for the selected row 434*a*. The timer is preferably set to a value greater than the discovery hello time, e.g., nine seconds. Each time switch 302 receives another Discovery Hello message 500 from switch 303, engine 422 resets the timer for row 434*a*. If the timer expires, meaning that switch 302 has not received a Discovery Hello message 500 from switch 303 in over nine seconds, engine 422 clears entry 434*a*, thereby indicating that switch 303 is no longer an active member of switch stack 306.

Discovery Hello messages 500 are passed to the neighbor discovery engine 422 regardless of the spanning tree port state of the stack port 336 on which they are received. That is, even if the stack port 336 happens to be in the blocking state, Discovery Hello messages 500 are still captured and passed to engine 422. Furthermore, upon initialization of a stackable switch, it listens for Discovery Hello messages on its stack port 336 for a time equal to the expiration timer, e.g., nine seconds, to discover the membership of the switch stack to which it belongs. During this time, the stackable switch does not forward data traffic on its stack port 336.

Through the exchange of Discovery Hello messages 500, each switch 302-304 learns and keeps track of which switches are members of its switch stack 306.

Cross-Stack Rapid Transition Protocol

In accordance with the present invention, the cross-stack rapid transition engines 420 at the stacked switches 302-304 cooperate in the execution of a new protocol, the cross-stack rapid transition protocol, that rapidly re-establishes connectivity between the switch stack 306 and the root of the bridged network 300 in the face of network failures or changes without introducing loops. To implement the cross-stack rapid transition protocol, the stacked switches 302-304, among other things, are configured such that the stack ports 336 do not block for any VLAN, and one of the stacked switches is elected as the path to the root of the bridged network 300 (or is the root of the bridged network). In particular, when determining which of its ports is to be its root port and which of its ports, if any, are to be designated ports, the STP engine 406 of each stacked switch 302-304 assumes that the switch's stack port 336 has a cost of zero.

By assigning a zero cost to the stack ports 336, the cross-stack rapid transition protocol increases the chances that a stack port will be selected as the root port of the respective member of the stack, except for the stack member that becomes the Stack Root, whose stack port 336 then becomes a Designated Port. The assignment of a zero cost to the stack ports 336 also results in all of the members of the stack advertising the same cost to the root of the bridged network 300.

In accordance with the RSTP protocol, switches 302-304 and backbone switches 310-312 proceed to elect a single switch as the root of the bridged network 300. If they are running the MSTP protocol, switches 302-304 and backbone switches 310-312 elect a root for each MST instance established in the bridged network 300. Suppose backbone switch 310 is elected the root of the bridged network 300. The stacked switches 302-304 then proceed to identify their root ports and their designated ports, if any. Suppose also that stacked switch 302 has the lowest cost path to the root 302 via port 324 coupled to link 314 from among the switches 302-304 of the switch stack 306. In this case, switch 302 elects its port 324 coupled to link 314 as its root port and transitions this port to the forwarding spanning tree port state, as indicated by the designation F on FIG. 3. Because the cost of the stack ports 336 at switches 303 and 303 is assumed to be zero during STP calculations, these ports present the lowest cost paths from switches 303 and 304 to the root 310. Accordingly, the STP engines 406 at switches 303 and 304 elect their stack ports 336 as their root ports and transition these ports 336 to the forwarding spanning tree port state. Port 324 at switch 302 coupled to link 315, port 324 at switch 303 coupled to link 316, port 324 at switch 304 coupled to link 317, and port 324 at switch 304 coupled to link 318 all represent alternate (higher cost) paths from those switches to the root 310. Accordingly, the STP engines 406 at switches 302-304 transition these ports 324 to the blocking spanning tree port state, as indicated by the designation B on FIG. 3. The STP engine 406 at switch 302 also determines that its stack port 336 is a designated port and thus transitions this port to the forwarding spanning tree port state, as indicated by the F designation on FIG. 3.

As indicated above, port 324 at switch 302 coupled to link 314 represents the lowest cost path from the switch stack 306 to the root 310 of the bridged network 300. Accordingly, switch 302 is deemed the Stack Root (SR) and its port 324 coupled to link 314 is deemed the Stack Root Port (SRP) of the switch stack 306. In addition, ports 324 at switches 302-304 that represent alternate (higher cost) paths to the root 310 are deemed Alternate Stack Roots (ASRs) and switches 303 and 304 are deemed Alternate Stack Roots (ASRs).

It should be understood that rather than or in addition to assigning a zero cost to the stack ports 336, higher path costs may be assigned to the other ports 324 of switches 302-304.

Those skilled in the art will recognize that numerous failure scenarios or network changes may cause switch stack 306 to loose its connectivity to the root 310. As described herein, execution of the cross-stack rapid transition protocol ensures that such connectivity is rapidly re-established without introducing loops into the bridged network 300.

Stack Root Port Connection Fails

Suppose, for example, that the connection from stacked switch 302 to the root 310 of the bridged network 300 fails, e.g., link 314 or port 324 at switch 302 fails. Switch 302 detects this failure when it stops receiving BPDU messages from root 310 via link 314. In this example, switch 302 has an alternate path to root 310, namely via link 315 and backbone switch 311. STP engine 406 of switch 302 preferably responds to this failure scenario by seeking permission from the other members of the switch stack 306 to transition its port 324 coupled to link 315 from the blocking state to the forwarding state.

Figure 1:
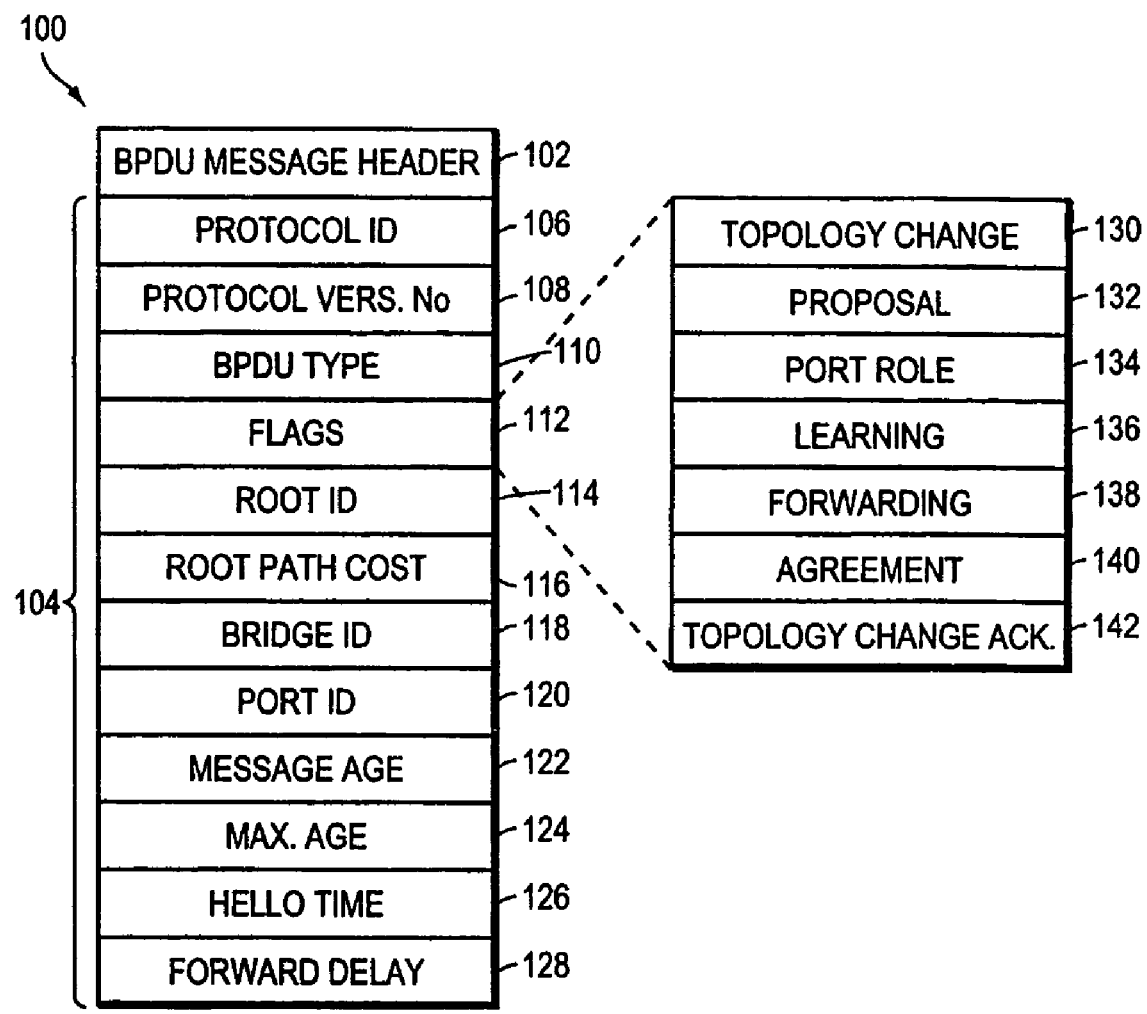
FIG. 1, previously discussed, is a highly schematic illustration of a Rapid Spanning Tree Protocol bridge protocol data unit message.
Figure 2:
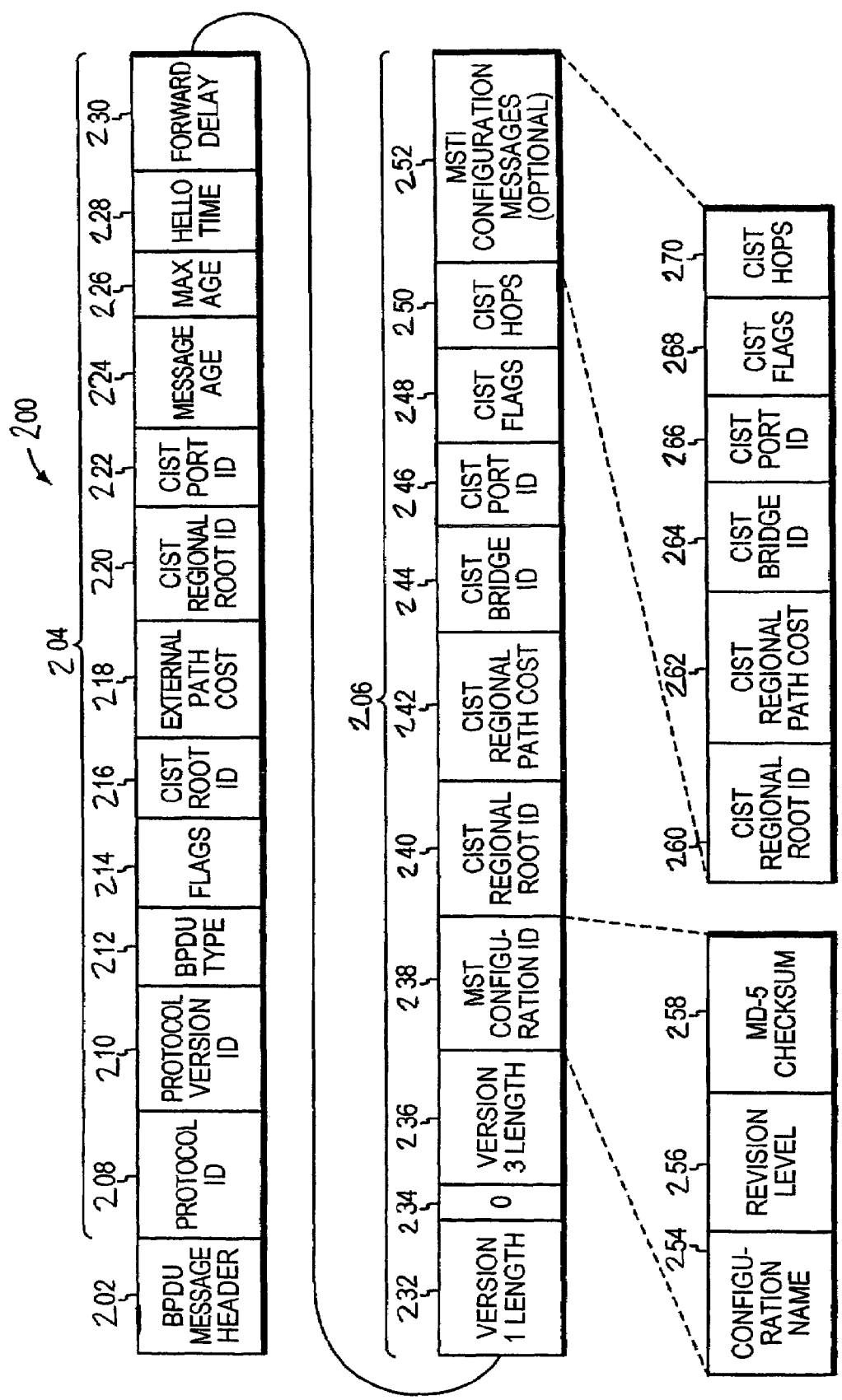
FIG. 2, previously discussed, is a highly schematic illustration of a Multiple Spanning Tree bridge protocol data unit message.

Specifically, BPDU message generator 414 generates one or more proposal BPDU messages, which are then transmitted by switch 302 from its stack port 326. Specifically, switch 302 generates and transmits RSTP BPDU messages 100 (FIG. 1) or MSTP BPDU messages 200 (FIG. 2) with the proposal flag field 132 (FIG. 1) asserted. These proposal BPDU message propose transitioning the subject port to the forwarding state. Switch 302 also transitions its current Stack Root Port, at which the failure was detected, to the blocking state preferably before sending any proposal BPDU messages. Engine 420 at switch 302 also clears its ACK list 426. The proposal BPDU messages from switch 302 are received at switches 303 and 304 on their stack ports 324. The proposal BPDU messages are passed to the STP engines 406 at switches 303 and 304 where they are evaluated, i.e., compared to the current STP information still in effect at those switches. Suppose that the STP engine 406 at switch 304 concludes that its port 324 coupled to link 318 represents a better path to the root 310 than that proposed in the proposal BPDU messages from switch 302. Rather than acknowledging the proposal BPDU message from switch 302, the STP engine 406 of switch 304 generates and transmits one or more proposal BPDU messages of its own, proposing to transfer its port 324 coupled to link 318 to the forwarding state. Engine 420 at switch 304 similarly clears its ACK list 426, and confirms that its other ASRPs, i.e., port 324 coupled to link 317, are in the blocking state. The proposal BPDU messages from switch 304 are received on the stack ports 326 of switches 302 and 303, and are passed to the STP engines 406 of those is switches.

Assuming the proposal BPDU messages from switch 304 represent the best new path from switch stack 306 to root 310 following the failure of link 314, then switches 302 and 303 both respond by generating and transmitting one or more Rapid Transition Acknowledgment messages to switch 304. Switches 302 and 303 also transition their ports providing connectivity to the root 310, i.e., their ASRPs, to the blocking spanning tree port state, or confirm that those ports are already in the blocking state. That is, switch 302 transitions its ports 324 coupled to links 314 and 315 to the blocking state, and switch 303 transitions its port 324 coupled to link 316 to the blocking state, assuming they were not already blocking.

FIG. 6 is a highly schematic illustration of a preferred form of a Rapid Transition Acknowledgement message 600. Message 600 has a plurality of fields, each of which carries information, such as a value. Specifically, message 600 has a MAC DA field 602, a MAC SA field 604, an Ethernet SNAP field 606, a version (VERS) field 608, and a type field 610. Message 600 further includes a sending bridge field 612, a designated bridge field 614, an instance ID field 616, a CST root ID field 618, a root path cost field 620, a designated path cost field 622, an instance root ID field 624, an instance root path cost field 626 and a port ID field 628.

Switch 302 loads the fields of its Rapid Transition Acknowledgement message 600 as follows. In the MAC DA field 602, switch 302 preferably loads the bridge multicast address. In the MAC SA field 604, switch 302 loads the MAC address of the port from which switch 302 is transmitting the Rapid Transition Acknowledgment message 600, e.g., the MAC address of its stack port 336. Switch 302 preferably loads the Ethernet SNAP field 606, Version field 608, and Type field 610 with predetermined values associated with the Cross-Stack Rapid Transition Protocol, thereby reflecting that the message is a Rapid Transition Acknowledgment message. In the Sending Bridge field 612, switch 302 enters a unique value identifying itself, such as its Bridge ID, which is a concatenation of a settable priority value, a system ID, and a MAC address. In the Designated Bridge field 614, switch 302 enters the Bridge ID of the proposed Stack Root. In the Instance ID field 616, switch 302 enters the VLAN ID of a VLAN that maps to the is spanning tree instance of the proposal BPDU messages sent by switch 304. If the switches of network 300 are running the RSTP, and there are no VLANs, field 616 is preferably cleared. Fields 616-626 are loaded with the same corresponding values as contained in the received proposal BPDU. In this way, when switch 304 receives the Rapid Transition Acknowledgment message 600, it can match the received Rapid Transition Acknowledgement message 600 to the proposal BPDU message that switch 304 sent. Port ID field 628 is loaded with an identifier of the port from which switch 302 sends the Rapid Transition Acknowledgment message 600, i.e., the ID associated with the stack port 336 of switch 302.

As switch 304 receives each Rapid Transition Acknowledgement message 600, it updates its ACK list 426. Specifically, each Rapid Transition Acknowledgement message 600 received at switch 304 is passed to the cross-stack rapid transition engine 420 for evaluation. Engine 420 examines the source of the received Rapid Transition Acknowledgement message 600, e.g., switch 302, and updates its ACK list 426 to indicate that a Rapid Transition Acknowledgement message 600 has been received from that member of the switch stack 306. Engine 420 then checks to see whether it has received Rapid Transition Acknowledgement messages 600 from all members of the switch stack 306, or whether it is still waiting to receive a Rapid Transition Acknowledgement message 600 from one or more members of the switch stack 306. Engine 420 preferably utilizes the information in its neighbor list 424 to make this determination. In particular, the neighbor list 424 specifies which switches, i.e., switches 302 and 303, are members of the switch stack 306. At this point, engine 420 determines that it has only received a Rapid Transition Acknowledgement message 600 from switch 302, and that it is still waiting for a Rapid Transition Acknowledgement message 600 from switch 303.

Switch 303 similarly generates and transmits a Rapid Transition Acknowledgement message 600 in response to the proposal BPDU message from switch 304. This Rapid Transition Acknowledgement message 600 is similarly received at switch 304, and passed to engine 420 for evaluation. Engine 420 updates its ACK list 426 to reflect that it has now received a Rapid Transition Acknowledgement message 600 from switch 303. Engine 420 also examines its neighbor list 424 and this time concludes that it has received a Rapid Transition Acknowledgement message 600 from all members of the switch stack 306. Accordingly, engine 420 directs STP engine 406 to transition the ASRP of switch 304 for which the proposal was made, i.e., port 324 coupled to link 318, from the blocking spanning tree port state directly to the forwarding spanning tree port state without transitioning that port among any intermediary spanning tree port states, such as the listening or learning states, among others. Port 324 coupled to link 318 at switch 304 can thus begin sending and receiving messages to and from the bridged network 300 right away. Because switches 302 and 303 placed their ports that provide connectivity to the root 310 in the blocking state, as part of those switches' response to the proposal BPDU message from switch 304, no loops are created when switch 304 transitions its ASRP directly to the forwarding state.

To conserve communications bandwidth, the recipient of the Rapid Transition Acknowledgement messages 600, i.e., switch 304, preferably does not respond to the source of those messages with any type of Acknowledgment of its own. Nonetheless, those skilled in the art will recognize that, in an alternative arrangement, a stacked switch could be configured to issue a first Rapid Transition Acknowledgement message 600, then wait for an Acknowledgement before issuing one or more follow-up Rapid Transition Acknowledgement messages 600. Those skilled in the art will recognize that other designs are also possible.

Suppose that, at the time link 314 failed, switch 302 lacked an alternative path to the root 310. In the absence of an alternate path to the root, switch 302 preferably responds to the failure at its Stack Root Port by presuming that it is now the root of the bridged network 300. In this case, switch 302 generates and transmits one or more BPDU messages, which indicate that it is the root, from its non-edge ports, which in this case means its stack port 336. These BPDU messages are received at switches 303 and 304 on their stack ports 336, and they are passed to the switch's STP engines 406. The STP engines 406 of switches 303 and 304 conclude that backbone switch 310 has a lower bridge ID than switch 302, and that backbone switch 310 is therefore still a "better" root than switch 302. Switches 303 and 304 further conclude that they both have alternative paths to root 310, namely via backbone switch 311 for switch 303 and via backbone is switches 311 and 312 for switch 304. In this case, the STP engines 406 at both switch 303 and switch 304 respond to the BPDU messages from switch 302, not with any acknowledgements, but by generating and sending one or more proposal BPDU messages of their own, which seek permission to transition their respective ASRPs rapidly to the forwarding spanning tree port state. The proposal BPDU messages from switch 304 request permission to transition the better of its two ASRPs, i.e., the one presenting the lower cost path to root 310. Switches 303 and 304 also clear the contents of their ACK lists 426.

The proposal BPDU messages from switch 303 are received at switches 302 and 304, and the proposal BPDU messages from switch 304 are received by switches 302 and 303. The proposal BPDU messages are passed to each switch's STP engine 406 for evaluation.

Suppose further that the proposal BPDU message from switch 304 for port 324 coupled to link 318 represents the best new path to the root 310. In this case, both switches 302 and 303 transition their ports, if any, providing connectivity to the root 310 to the blocking spanning tree port state (if they are not already blocking), and generate and transmit one or more Rapid Transition Acknowledgment messages 600 to switch 304. When switch 304 receives the Rapid Transition Acknowledgement message 600 from switch 302, it is passed to the cross-stack rapid transition engine 420 for evaluation.

Engine 420 updates its ACK list 426 to indicate that a Rapid Transition Acknowledgement message 600 has been received from switch 302. Engine 420 then determines whether it has now received Rapid Transition Acknowledgement messages 600 from all members of the switch stack 306 by examining its neighbor list 424. The neighbor list 424 reflects that switches 302 and 303 are members of this switch stack 306. As switch 304 has yet to receive a Rapid Transition Acknowledgement message 600 from switch 303, engine 420 concludes that it has not yet received a Rapid Transition Acknowledgement message 600 from all members of the switch stack 306.

Switch 303 similarly generates and transmits a Rapid Transition Acknowledgement message 600 to switch 304. This Rapid Transition Acknowledgement message 600 is similarly passed to engine 420 for evaluation. Engine 420 updates its ACK list 426 to is reflect that it has now received a Rapid Transition Acknowledgement message 600 from switch 303 as well. Engine 420 also examines its neighbor list 424 and this time determines that it has now received a Rapid Transition Acknowledgement message 600 from all members of the switch stack 306. Accordingly, engine 420 directs STP engine 406 to transition the ASRP of switch 304 for which the proposal was made directly from the blocking spanning tree port state to the forwarding spanning tree port state without transitioning the port among any intermediary spanning tree port states. Port 324 coupled to link 318 at switch 304 thus begins forwarding and receiving messages to and from the bridged network 300 right away. Because switches 302 and 303 placed their ports that provide connectivity to the root 310 in the blocking state as part of those switches' response to the proposal BPDU message from switch 304, no loops are generated when switch 304 transitions its ASRP to the forwarding state.

Link Connecting Former Stack Root Resumes Operation

Suppose further that, after the ASRP at switch 304 becomes the new Stack Root Port for the switch stack 306, that link 314 resumes operation again. Switch 302 will then receive one or more proposal BPDU messages from the root 310 via link 314. The proposal BPDU messages seek permission for the root 310 to assign its port coupled to link 314 to the Designated Port Role, and to transition this port to the forwarding state. Based on the information contained in these proposal BPDU messages, moreover, the STP engine 406 at switch 302 concludes that its port 324 coupled to link 314 should become the Stack Root Port again. Before responding to root 310 with a confirmation BPDU, the STP engine 406 of switch 302 first transitions all non-edge ports, i.e., all ports on which BPDUs have been received, to the blocking spanning tree port state, i.e., port 324 coupled to link 315. Because ports 324 coupled to end stations 326 and 328 are edge ports, they may remain in the forwarding state. The STP engine 406 of switch 302 then generates and transmits one or more proposal BPDU messages from its stack port 336, requesting permission to transition its port 324 coupled to link 314 to the forwarding state. These proposal BPDU messages are received at the stack ports 324 of switches 303 and 304, and passed to their STP engines 406. Suppose that the STP engines 406 of both switches 303 and 304 conclude that the proposal BPDU message represents the best path is from the switch stack 306 to the root 310 of the bridged network 300. In response, switch 304, whose ASRP had become the new root port, transitions its ASRP, i.e., port 324 coupled to link 318, to the blocking spanning tree port state, and issues a Rapid Transition Acknowledgement message 600 on its stack port 336 directed to switch 302.

Switch 303 similarly concludes that the proposal BPDU message from switch 302 is better than the current BPDU information at switch 303. Accordingly, the STP engine 406 at switch 303 also generates and transmits a Rapid Transition Acknowledgement message 600 to switch 302.

Switch 302 tracks the receipt of Rapid Transition Acknowledgement messages 600 from the other members of the switch stack 306. Once engine 420 at switch 302 has received a Rapid Transition Acknowledgement message 600 from each member of the switch stack 306, it directs the STP engine 406 to transition the port 324 coupled to link 314 to the forwarding state directly without transitioning through any intermediary spanning tree port states.

Stack Root is Shut-Down or Fails

Another possible failure scenario is where the Stack Root 302 is shut-down or suffers some failure, such as a software crash. In this case, the remaining members of switch stack 306, i.e., switches 303 and 304, will learn of the shut-down or failure of switch 302 because they will stop receiving Discovery Hello messages 500 from switch 302. As indicated above, stacked switches 302-304 each have a neighbor list 424 that indicates which other switches are members of the switch stack 306. Each entry of the neighbor list 424, moreover, has a timer that is reset upon receipt of another Discovery Hello message 500 from the switch corresponding to that entry. Because switches 303 and 304 stop receiving Discovery Hello messages 500 from switch 302, the timers established at switches 303 and 304 for the entries in their neighbor lists that correspond to switch 302 are not reset and will eventually expire. In response, the stack members, e.g., switches 303 and 304 both remove switch 302 from their respective neighbor lists 424, thereby reflecting that switch 302 is no longer considered by switches 303 and 304 to be is a member of the switch stack 306. Similarly, because switch 302 was the Stack Root of stack switch 306, it periodically sent BPDU messages on its stack port 324 to switches 303 and 304, and switches 303 and 306 each maintained an Max Age timer, which was reset each time switches 303 and 304 received one of these periodic BPDU messages from switch 302. Since switch 302 is no longer transmitting BPDU messages, the Max Age timer at switches 303 and 304 will also expire.

When the Max Age timer at switches 303 and 304 expire, switches 303 and 304 first determine whether they have an ASRP, i.e., an alternate path to the root 310 of the bridged network, which, although not currently in use, appears to be available as a path to the root 310. Here, both switches 303 and 304 have at least one ASRP. Accordingly, both switches 303 and 304 clear the contents of their ACK lists 426, and generate and transmit one or more proposal BPDU messages requesting permission to transition their respective ASRPs directly to the forwarding spanning tree port state. Again, switch 304, which has multiple ASRPs, transmits proposal BPDU messages only for the one ASRP representing the "best" path to the root. Switch 303 will thus receive a proposal BPDU message from switch 304, and switch 304 will similarly receive a proposal message from switch 303. The two switches 303 and 304 examine the received proposal BPDU messages and determine whether the received proposal BPDU message is "better" than the proposal BPDU message sent by the respective switch.

Suppose, in this case, that switch 303 sent the better proposal BPDU message. Then, switch 304 responds by transitioning its ASRPs to the blocking state (or ensuring that its ASRPs are still in the blocking state), and generating and transmitting one or more Rapid Transition Acknowledgement messages 600 to switch 303. When switch 303 receives the Rapid Transition Acknowledgement message 600 from switch 304, engine 420 updates its ACK list 426 to reflect that it has received a Rapid Transition Acknowledgement message 600 from switch 304. Engine 420 also checks its neighbor list 424 to see whether it has now received a Rapid Transition Acknowledgement message 600 from all members of the switch stack 306. Because switch 302 was removed from the neighbor list 424, the only active entry in the neighbor list 424 at switch 303 is for switch 304. Accordingly, upon receiving the Rapid Transition Acknowledgement message 600, switch 303 concludes that it has received a Rapid Transition Acknowledgement message 600 from all members of the switch stack 306. Accordingly, engine 420 at switch 303 directs the STP engine 406 to transition the ASRP at switch 303, i.e., port 324 coupled to link 316, from the blocking state directly to the forwarding state without passing through any intermediate spanning tree port states. Switch 303 may thus begin forwarding and receiving network messages to and from the bridged network 300 on its ASRP immediately.

As switch 302 was shut-down or failed and thus cannot forward any network messages, and the ASRPs of switch 304 are in the blocking state, no loops are created by transitioning the ASRP at switch 303 to the forwarding state.

Former Stack Root is Re-Initialized or Re-Booted

Suppose that after failing, the former Stack Root 302 is re-booted or re-initialized. The same process as described above when link 314 resumed operation following an earlier failure is followed in this situation.

Non-Stack Root Fails or is Turned-Off

Another possible failure scenario is a failure or powering-down of a member of the switch stack 306 that is not the Stack Root. Suppose, for example, that switch 302 is the Stack Root and that switch 304 is turned-off or crashes. In this case, switch 304 will stop transmitting Discovery Hello messages 500. Accordingly, the entries at the neighbor lists 424 at switches 302 and 303 that were created for switch 304 will time-out. Engines 420 at switches 302 and 303 respond by removing switch 304 from the list of switches that are considered to be members of stack switch 306. Thereafter, should either switch 302 or 303 be looking for Rapid Transition Acknowledgement messages 600 from the members of the switch stack 306, it will not expect or wait for a Rapid Transition Acknowledgement message 600 from switch 304 which is no longer considered to be a member of switch stack 306.

Network Reconfiguration Causes a New Stack Root to be Chosen as the Stack Root Port Suppose the network administrator makes changes to the bridged network 300 such that switch 303 now has the better path to the root 310, rather than the current Stack Root, i.e., switch 302. More specifically, switch 303 will begin receiving BPDU messages on its ASRP that make its ASRP a better root port than its stack port 326. Upon determining that its path is better, the STP engine 406 at switch 303 generates and transmits one or more proposal BPDU message seeking permission to transition its ASRP from the blocking state to the forwarding state. These proposal BPDU messages are received by switches 302 and 304 on their stack ports 336. The STP engines 406 of switches 302 and 303 examine these proposal BPDU and conclude that switch 303 indeed does have the better path to the root 310. In response, the STP engine 406 at switch 302 transitions its port 324 coupled to link 314, which is the current Stack Root Port, to the blocking state and confirms that its ASRP is in the blocking state. Switch 302 then generates and transmits one or more Rapid Transition Acknowledgement message 600 to switch 303, signaling its agreement that switch 303 should become the new Stack Root of the switch stack 306.

The STP engine 406 of switch 304 similarly concludes that the information contained in the proposal BPDU message from switch 303 indicates that switch 303 should become the new Stack Root. In this case, engine 420 of switch 304 generates and transmits one or more Rapid Transition Acknowledgement messages 600 to switch 303, signaling its agreement that switch 303 should be the new Stack Root. As switch 303 receives each Rapid Transition Acknowledgement message 600, it updates its ACK list 426 with an identifier of the source of the message 600. Engine 420 also keeps checking its neighbor list 424 to determine when it has received a Rapid Transition Acknowledgement message 600 from each member of the switch stack 306. Once switch 303 has received a Rapid Transition Acknowledgement message 600 from each member of the switch stack 306, the STP engine 406 of switch 303 transitions the port with the better path to the root 310 directly to the forwarding state without transitioning the port through any intermediary spanning tree port states.

Network Reconfiguration Causes a New Port of the Stack Root to be Chosen as the Stack Root Port Suppose the network administrator makes changes to the bridged network 300 such that port 324 coupled to link 315, rather than port 324 coupled to link 314 has the better path to the root 310. In this case, the STP engine 406 at switch 302 preferably transitions the existing Stack Root Port, i.e., port 324 coupled to link 314, to the blocking state, and then transitions the new Stack Root Port, i.e., port 324 coupled to link 315, to the forwarding state. Significantly, switch 302 does not issue any proposal BPDU messages nor does it wait for any Rapid Transition Acknowledgement messages 600 from the other members of the switch stack 306. Because the change to a new Stack Root Port by the existing Stack Root does not call for any changes by the other members of the switch stack 306, the existing Stack Root, i.e., switch 302, can change to a new Stack Root Port without notifying or waiting for acknowledgments from the other members of the switch stack 306.

New Switch is Added to the Switch Stack Which Becomes the Stack Root

Suppose that a new switch (not shown) is added to the switch stack 306, thereby increasing the number of switches that make up stack 306 from three to four. This new switch also has a stack port that is connected to the stack ports 336 of the other switches 302-304 via link 328. Suppose further that the new switch has a path to the root 310 that represents a better path than the path from the current Stack Root, i.e., switch 302. There are at least two alternative processes by which the new switch may be elected to be the new Stack Root of the switch stack 306. First, suppose that the new switch receives a proposal BPDU message from a non-stack switch on the port that provides the better path to the root 310. Based on the information contained in the proposal BPDU message, the STP engine 406 of the new switch concludes that this port on which the proposal BPDU message was received should become its root port. The new switch is preferably configured to run the same spanning tree protocol version, i.e., RSTP or MSTP, as the other stack members.

Second, suppose that, instead of receiving a proposal BPDU message from a non-stack switch on the port that provides the better path to the root 310, the new switch receives one or more of the periodic BPDU messages sent from switch 302, whose port 324 is coupled to link 314 is the current Stack Root Port for the switch stack 306. In this case, the new switch concludes that it has a better path to the root than the path reflected in the BPDU message received from switch 302. The new switch responds by generating and transmitting one or more proposal BPDU messages requesting permission to transition its port representing the better path to the root to the forwarding state. These proposal BPDU messages are received at the other switches 302-304 of the switch stack 306 and evaluated. Switches 303 and 304 conclude that the new switch indeed has the better path to the root, and they respond by generating and transmitting one or more Rapid Transition Acknowledgement message 600 to the new switch. Switch 302 similarly concludes that the new switch has a better path to the root 310. In response, switch 302 first transitions its root port, i.e., port 324 coupled to link 314, to the blocking spanning tree port state. Switch 302 then generates and transmits one or more Rapid Transition Acknowledgement message 600 to the new switch. Once the new switch has received a Rapid Transition Acknowledgement message 600 from each member of the switch stack 306, it transitions its non-stack port directly to the forwarding spanning tree port state without transitioning the port through any intermediary spanning tree port shares.

Those skilled in the art will recognize that various alternative embodiments of the invention are possible. For example, rather than issuing one or more Rapid Transition Acknowledgement messages 600 in response to a received proposal BPDU message, the stack members may be configured to send Rapid Transition Acknowledgement messages 600 periodically for some set time.

In addition, it should be understood that one or more of the stack ports 336 need not be a true physical port. For example, one or more of the "stack ports" could be implemented through a switching fabric, such as a backplane, that links the members of the switch stack. Indeed, one or more of the individual stack members could be implemented as a line card that is in communicating relationship (via the "stack port") with the other stack members/line cards, all of which may be disposed within the same housing or rack. In this embodiment, the cross-stack rapid transition protocol operates like a decentralized spanning tree protocol. Those skilled in the art will recognize that other alternatives are similarly possible.

The foregoing description has been directed to specific embodiments of this invention. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. In a plurality of intermediate network devices having a plurality of ports for forwarding network messages within a bridged network having a root, the plurality of intermediate network devices organized as a stack, each intermediate network device having a stack port for use in communicating with the other network devices of the stack, a method for efficiently transitioning the ports among a plurality of spanning tree protocol (STP) states, the method comprising the steps of:

executing the STP at each intermediate network device of the stack so as to assign the stack port of each device to either a Root Port Role or a Designated Port Role, and to assign a non-stack port at a single device of the stack to the Root Port Role;

transitioning the ports assigned to the Root Port Role and the Designated Port Role to a forwarding STP state;

designating all non-stack ports at the devices of the stack that provide connectivity to the root, other than the non-stack port assigned to the Root Port Role, as Alternate Stack Root Ports;

transitioning the Alternate Stack Root Ports to a discarding STP state; and in response to a failure at the non-stack port assigned to the Root Port Role, transitioning a selected one of the Alternate Stack Root Ports from the discarding STP state directly to the forwarding STP state, without transitioning the selected port through any intermediary STP states, so that the selected Alternate Stack Root Port assumes Root Port Role for the stack.

2. The method of claim 1 wherein
each Alternate Stack Root Port has a respective cost to the root; and
the selected one of the Alternate Stack Root Ports that is transitioned to the forwarding STP state is the Alternate Stack Root Port whose cost to the root is lowest.

3. The method of claim 2 further comprising the step of, in response to the failure at the non-stack port assigned to the Root Port Role, generating and issuing, from one or more source devices of the stack for receipt by one or more other devices of the stack, one or more bridge protocol data unit (BPDU) messages proposing to transition a given Alternate Stack Root Port of the device to the forwarding STP state.

4. The method of claim 3 further comprising the step generating and issuing, in response to the proposal BPDU message, one or more Rapid Transition Acknowledgement messages to the source device agreeing with the source device's proposal to transition the given Alternate Stack Root Port to the forwarding STP state.

5. The method of claim 4 further comprising the step of transitioning the given Alternate Stack Root Port of the source device from the discarding STP state directly to the forwarding STP state, without passing through any intermediary states, provided that the source device receives a Rapid Transition Acknowledgement message from each other member of the stack.

6. The method of claim 1 wherein the spanning tree protocol is one of the IEEE Std 802.1w.1w-2001 and the IEEE Std. 802.1s-2002 specification standards.

7. The method of claim 1 further comprising the step of associating each stack port with a port cost of zero, such that the stack port of each device is assigned to either a Root Port Role or a Designated Port Role.

8. The method of claim 1 further comprising the step of monitoring which intermediate network devices are organized as the stack.

9. The method of claim 8 wherein the step of monitoring comprises the step of periodically exchanging Discovery Hello messages among the intermediate network devices organized as the stack.

10. The method of claim 1 further comprising:
associating each stack port with a cost lower than that of non-stack ports to cause all the stack ports to be assigned to the forwarding STP state.

11. In an intermediate network device having a plurality of ports for forwarding network messages within a bridged network, and a stack port for communicating with one or more other intermediate network devices that together form a stack, a method for efficiently transitioning the ports among a plurality of spanning tree protocol (STP) states, the method comprising the steps of:

executing the STP so as to assign the stack port to a Root Port Role;

transitioning the stack port, which has been assigned to the Root Port Role, to a forwarding STP state;

designating all non-stack ports that provide connectivity to the root as Alternate Stack Root Ports;

transitioning the Alternate Stack Root Ports to a discarding STP state; and in response to receiving from a source intermediate network device a proposal Bridge Protocol Data Unit (BPDU) message on the stack port that specifies a path cost to the root and that seeks to transition a port of the source device to a forwarding state, issuing one or more Rapid Transition Acknowledgment messages to the source device, provided that the specified path cost of the proposal BPDU is lower than the root path costs associated with the Alternate Stack Root Ports, wherein the one or more Rapid Transition Acknowledgment messages signal the intermediate network device's agreement to the port of the source device transitioning directly to the forwarding state without transitioning through any intermediary STP states, so that the port of the source device assumes Root Port Role for the stack.

12. The method of claim 11 further comprising the step of issuing a proposal BPDU message to the source device, provided that the specified path cost of the proposal BPDU that was received is higher than the root path cost associated with a selected one of the Alternate Stack Root Ports.

13. The method of claim 12 further comprising the step of transitioning the selected Alternate Stack Root Port from a discarding state directly to a forwarding state provided that the intermediate network device receives a Rapid Transition Acknowledgment message from each device that forms part of the stack.

14. The method of claim 13 wherein the intermediate network device recognizes one or more Virtual Local Area Networks (VLANs), and the stack port is forwarding for all VLANs recognized by the intermediate network device.

15. An apparatus comprising:

means for executing a spanning tree protocol (STP) to assign a stack port of the apparatus to a Root Port Role, the stack port for communicating with one or more other apparatus that together form a stack;

means for transitioning the stack port, which has been assigned to the Root Port Role, to a forwarding STP state;

means for designating a plurality of non-stack ports of the apparatus that provide connectivity to a root as Alternate Stack Root Ports;

means for transitioning the Alternate Stack Root Ports to a discarding STP state; and means for issuing, in response to receiving from a source device a proposal Bridge Protocol Data Unit (BPDU) message on the stack port that specifies a path cost to the root and that seeks to transition a port of the source device to a forwarding state, one or more Rapid Transition Acknowledgment messages to the source device, provided that the specified path cost of the proposal BPDU is lower than the root path costs associated with the Alternate Stack Root Ports, wherein the one or more Rapid Transition Acknowledgment messages signal the apparatus's agreement to the port of the source device transitioning directly to the forwarding state without transitioning through any intermediary STP states, so that the port of the source device assumes Root Port Role for the stack.

* * * * *

UNITED STATES PATENT AND TRADEMARK OFFICE
CERTIFICATE OF CORRECTION

PATENT NO. : 7,480,258 B1  Page 1 of 2
APPLICATION NO. : 10/614257
DATED : January 20, 2009
INVENTOR(S) : Pauline Shuen et al.

It is certified that error appears in the above-identified patent and that said Letters Patent is hereby corrected as shown below:

Col. 1, Line 21, please amend as shown:

employ a data communication[[ is]] protocol (LAN standard),

Col. 1, Line 67, please amend as shown:

est cost path to the Root Bridge. The Root Ports and[[ Designate]] Designated

Col. 4, Line 24, please amend as shown:

[[Is ]]A computer network may also be segmented into a series

Col. 4, Line 66, please amend as shown:

Between switches while maintaining the[[ is]] VLAN association

Col. 10, Line 23, please amend as shown:

may be delivered to a given port, e.g.,[[ PI]] P1

Col. 10, Line 43, please amend as shown:

(RSTP)[[.]] (IEEE Std 802.1w.1w-2001) or the Multiple Span-

Col. 14, Line 23, please amend as shown:

of those[[ is]] switches.

Col. 14, Line 64, please amend as shown:

VLAN that maps to the[[ is]] spanning tree instance of the pro-

Col. 16, Line 16, please amend as shown:

switch 311 for switch 303 and via backbone[[ is]] switches 311

Col. 16, Line 19, please amend as shown:

sages from switch 302, not with any acknowledg[[e]]ment

Signed and Sealed this

Seventh Day of September, 2010

David J. Kappos
*Director of the United States Patent and Trademark Office*

Col. 17, Line 35, please amend as shown:

proposal BPDU message represents the best path[[ is]] from the

Col. 18, Line 7, please amend as shown:

302 is no longer considered by switches 303 and 304 to be[[ is]]